(12) United States Patent
Bahadur Thapa et al.

(10) Patent No.: US 10,662,844 B2
(45) Date of Patent: May 26, 2020

(54) SYSTEM AND METHOD TO DETERMINE A FLOW RATE OF A WASHING LIQUID AT AN EXHAUST GAS INLET OF AN EXHAUST GAS CLEANING SYSTEM OF A MARINE VESSEL

(71) Applicant: YARA MARINE TECHNOLOGIES AS, Oslo (NO)

(72) Inventors: Shyam Bahadur Thapa, Oslo (NO); Christoffer Ahlström, Torslanda (SE)

(73) Assignee: YARA MARINE TECHNOLOGIES AS, Oslo (NO)

( * ) Notice: Subject to any disclaimer, the term of this patent is extended or adjusted under 35 U.S.C. 154(b) by 0 days.

(21) Appl. No.: 16/337,562

(22) PCT Filed: Oct. 27, 2017

(86) PCT No.: PCT/EP2017/077558
§ 371 (c)(1),
(2) Date: Mar. 28, 2019

(87) PCT Pub. No.: WO2018/078075
PCT Pub. Date: May 3, 2018

(65) Prior Publication Data
US 2019/0323398 A1    Oct. 24, 2019

(30) Foreign Application Priority Data

Oct. 28, 2016  (EP) ..................................... 16196145

(51) Int. Cl.
*F01N 3/04* (2006.01)
*B01D 47/06* (2006.01)
*B01D 53/14* (2006.01)

(52) U.S. Cl.
CPC ............... *F01N 3/04* (2013.01); *B01D 47/06* (2013.01); *B01D 53/1481* (2013.01);
(Continued)

(58) Field of Classification Search
CPC .... F01N 3/04; F01N 2570/04; F01N 2590/02; B01D 47/06; B01D 53/1481; B01D 2252/1035
(Continued)

(56) References Cited

U.S. PATENT DOCUMENTS 6,301,888 B1 * 10/2001 Gray, Jr. ............ B01D 53/9495
                                                    123/568.11
6,651,432 B1 * 11/2003 Gray, Jr. ................. F01N 3/035
                                                    123/305
(Continued)

FOREIGN PATENT DOCUMENTS

| EP | 2 703 063 A1 | 3/2014 |
| EP | 3 085 911 A1 | 10/2016 |
| WO | 2014128261 A1 | 8/2014 |

OTHER PUBLICATIONS

PCT International Search Report and Written Opinion dated Jan. 31, 2018 in connection with PCT International Patent Application No. PCT/EP2017/077558, 9 pages.

*Primary Examiner* — Thai Ba Trieu
*Assistant Examiner* — Dapinder Singh
(74) *Attorney, Agent, or Firm* — Amster, Rothstein & Ebenstein LLP

(57) ABSTRACT

The present application relates to a system and method to determine a total flow rate $Q_{tot}$ of a washing liquid at a washing liquid inlet of an exhaust gas cleaning unit installed in a marine vessel, the exhaust gas cleaning unit comprising a scrubber pipe and two or more spraying nozzles mounted at different height levels in the scrubber pipe, being adapted to spray washing liquid into the exhaust gas present in the scrubber pipe and being operated by a valve adapted to open and to close the respective spraying nozzle. The system comprises at least one pressure sensor arranged to measure the pressure P outside the scrubber pipe before the valve (Continued)

operating the uppermost active spraying nozzle, and a process controller calculating the total flow rate $Q_{tot}$ of the washing liquid at the exhaust gas inlet of the exhaust gas cleaning unit by summing up the flow rate $Q_{ind}$ of the washing liquid flowing through each of the individual active spraying nozzles.

8 Claims, 2 Drawing Sheets

(52) U.S. Cl.
CPC .. *B01D 2252/1035* (2013.01); *F01N 2570/04* (2013.01); *F01N 2590/02* (2013.01)

(58) Field of Classification Search
USPC .................. 60/274, 277, 286, 295, 299–301
See application file for complete search history.

(56) References Cited

U.S. PATENT DOCUMENTS

| | | | |
|---|---|---|---|
| 7,628,008 B2* | 12/2009 | Ranalli | B01D 53/8653 60/278 |
| 9,068,489 B2* | 6/2015 | Thogersen | B01D 53/9409 |
| 2014/0000240 A1* | 1/2014 | Thogersen | F01N 3/10 60/274 |
| 2014/0065046 A1 | 6/2014 | Stallmann et al. | |
| 2016/0016109 A1 | 1/2016 | Strandberg | |

* cited by examiner

```
                    FLOWCALC_V2_1
                                                        20
                                 FlowCalc_V2
    PumpRunning ─┤ I_PumpRunning              O_Flow ├─ 663.0
           2.1 ─┤ I_Pressure
                                        O_Nozzle1_Flow ├─ 121.2572
    3RV1_Opened ─┤ I_Nozzle1_C           O_Nozzle2_Flow ├─ 205.432
    3RV2_Opened ─┤ I_Nozzle2_C           O_Nozzle3_Flow ├─ 0.0
        NotUsed ─┤ I_Nozzle3_C           O_Nozzle4_Flow ├─ 0.0
    3RV4_Closed ─┤ I_Nozzle4_C           O_Nozzle5_Flow ├─ 166.8231
    3RV5_Opened ─┤ I_Nozzle5_C           O_Nozzle6_Flow ├─ 169.7777
    3RV6_Opened ─┤ I_Nozzle6_C 1550.0 ─┤ C_Nozzle1_Kfactor
         2552.0 ─┤ C_Nozzle2_Kfactor
         2552.0 ─┤ C_Nozzle3_Kfactor
         1988.0 ─┤ C_Nozzle4_Kfactor
         1752.0 ─┤ C_Nozzle5_Kfactor
         1752.0 ─┤ C_Nozzle6_Kfactor 0.0 ─┤ C_Nozzle1_HeightCorr
            0.1 ─┤ C_Nozzle2_HeightCorr
           0.19 ─┤ C_Nozzle3_HeightCorr
         0.7185 ─┤ C_Nozzle4_HeightCorr
         0.8185 ─┤ C_Nozzle5_HeightCorr
         0.9085 ─┤ C_Nozzle6_HeightCorr -0.4 ─┤ C_Nozzle1_PressureCorr
           -0.4 ─┤ C_Nozzle2_PressureCorr
           -0.4 ─┤ C_Nozzle3_PressureCorr
           -0.4 ─┤ C_Nozzle4_PressureCorr
           -0.4 ─┤ C_Nozzle5_PressureCorr
           -0.4 ─┤ C_Nozzle6_PressureCorr
```

FIG. 2

SYSTEM AND METHOD TO DETERMINE A FLOW RATE OF A WASHING LIQUID AT AN EXHAUST GAS INLET OF AN EXHAUST GAS CLEANING SYSTEM OF A MARINE VESSEL

CROSS-REFERENCE TO RELATED APPLICATIONS

This application is a U.S. national stage entry under 35 U.S.C. § 371 of PCT International Patent Application No. PCT/EP2017/077558, filed Oct. 27, 2017, which claims priority to European Patent Application No. 16196145.3, filed Oct. 28, 2016, the contents of which are incorporated herein by reference in their entirety.

TECHNICAL FIELD

The application relates to the technical field of the determination of the total flow rate of the washing liquid within an exhaust gas cleaning unit, particularly at the level of the exhaust gas inlet of the exhaust gas cleaning unit, more specifically a wet scrubber system, installed in a marine vessel, the exhaust gas cleaning unit being arranged to clean the exhaust gas of one or more engines of the marine vessel.

BACKGROUND

According to the MEPC.259(68) 4.4.7, 2015 "Guidelines for exhaust gas cleaning systems", the EGC (exhaust gas cleaning) unit should automatically record wash water pressure and wash water flow rate at the EGC unit's (wash water) inlet connection.

At present, it is known to use a flow sensor for measuring the flow rate of the washing liquid at the washing liquid inlet of a wet scrubber. To comply with the requirements as mentioned above, each of the wet scrubbers installed in the marine vessel needs to be provided with such a flow sensor for measuring this flow rate, which makes it difficult to find an appropriate location in the marine vessel for installing these flow meters since at least 5 times the diameter of the straight pipe of the wet scrubber is necessary for the proper measurement of this flow rate.

It is consequently purposeful to provide a system and a method for determining the total flow rate of the washing liquid at the inlet of a wet scrubber that is less expensive, requires less space in the marine vessel, requires less maintenance and provides more reliable results compared to the flow sensors used in the art.

SUMMARY OF THE INVENTION

A first aspect of the present application provides in a system to determine a total flow rate $Q_{tot}$ of a washing liquid at a washing liquid inlet of an exhaust gas cleaning unit installed in a marine vessel, the exhaust gas cleaning unit comprising a scrubber pipe comprising an exhaust gas flowing between an exhaust gas inlet and an exhaust gas outlet;

two or more spraying nozzles mounted at different height levels in the scrubber pipe, wherein each of the spraying nozzles is adapted to spray washing liquid into the exhaust gas present in the scrubber pipe in order to clean at least part of the $SO_x$ out of the exhaust gas; and operated by a valve adapted to open and to close the respective spraying nozzle, and comprising an uppermost active spraying nozzle that is opened and activated by its respective valve;

wherein the system comprises at least one pressure sensor arranged to measure a pressure P applied to the uppermost active spraying nozzle, expressed in Bar; and a process controller calculating the flow rate Q of the washing liquid flowing through each of the individual active spraying nozzles, expressed in litre per minute or $m^3/h$, using the formula:

$$Qind = K \times \sqrt{(P - \text{pressure correction} + \text{height correction})},$$

wherein

K is a spraying nozzle factor depending on the type of spraying nozzle, the pressure correction is a correction factor of the pressure P as a function of the elevation of the respective spraying nozzle in the scrubber pipe, expressed in Bar, and the height correction is a correction factor of the pressure P based on the height difference between the location of the pressure sensor to the respective active spraying nozzle where the flow rate is calculated, expressed in Bar; and calculating the total flow rate $Q_{tot}$ of the washing liquid at the washing liquid inlet of the exhaust gas cleaning unit, expressed in liter per minute or $m^3/h$, by summing up the different flow rates Q of the washing liquid through each of the individual active spraying nozzles.

This system has the advantage that it saves a lot of space onboard of the marine vessel, it requires less maintenance and it provides in a more reliable reading. Existing systems can furthermore easily be retrofitted with this system.

In an embodiment of a system according to the application, the pressure P applied to the uppermost active spraying nozzle is the pressure of the washing liquid measured outside the scrubber pipe before the uppermost active spraying nozzle.

In an embodiment of a system according to the application, the spraying nozzles are of the spiral type.

These spraying nozzles have a high energy efficiency, are clog-resistant and have a high discharge velocity.

In an embodiment of a system according to the application, the valves operating the spraying nozzles are remotely controlled.

A second aspect of the present application provides in a method to determine a total flow rate $Q_{tot}$ of a washing liquid at an washing liquid inlet of an exhaust gas cleaning unit installed in a marine vessel, the exhaust gas cleaning unit comprising a scrubber pipe comprising an exhaust gas flowing between an exhaust gas inlet and an exhaust gas outlet in the scrubber pipe and two or more spraying nozzles in the scrubber pipe; wherein the method comprises the steps of spraying washing liquid by means of two or more active spraying nozzles, that are opened and activated by a respective operable valve, and that are arranged at different heights in the scrubber pipe of the exhaust gas cleaning unit, into the exhaust gas present in the scrubber pipe for cleaning at least part of the $SO_x$ out of the exhaust gas, measuring a pressure P applied to an uppermost active spraying nozzle opened and activated by its respective valve, expressed in Bar, using one or more pressure sensors;

calculating the flow rate $Q_{ind}$ of the washing liquid flowing through each of the separate active spraying nozzles, expressed in litre per minute, by means of a process controller using the formula:

$$Qind = K \times \sqrt{(P - \text{pressure correction} + \text{height correction})}$$

wherein

K is a spraying nozzle factor depending on the type of spraying nozzle, the pressure correction is a correction factor of the pressure P as a function of the elevation of the respective spraying nozzle in the scrubber pipe, expressed in Bar, and the height correction is a correction factor of the pressure P based on the height difference between the location of the pressure sensor to the respective spraying nozzle where the flow rate is calculated, expressed in Bar;

calculating the total flow rate $Q_{tot}$ of the washing liquid at the washing liquid inlet of the exhaust gas cleaning unit, expressed in liter per minute or m³/h, by means of the process controller by summing up the different flow rates $Q_{ind}$ of the washing liquid through each of the individual active spraying nozzles.

The pressure correction is a loss in pressure due to the distance between the main delivery pipe of washing liquid to the spraying nozzle, the pressure loss in the pipe itself, the pressure loss in elbows present in the main delivery pipe of washing liquid to the spraying nozzle, etc.

In a possible method according to the application, the pressure and the height correction are determined during installation of the exhaust gas cleaning unit.

In an embodiment of a method according to the application, the method uses a system according to application as described above.

A third aspect of the present application provides in a method according to the application as described above, wherein the method is computer-implemented.

A fourth aspect of the present application provides in a computer program product comprising program code instructions for implementing a method according to the application as described above.

A fifth aspect of the present application provides in a system according to the application as described above configured for executing a method according to the application as described above.

DESCRIPTION OF THE FIGURES

FIG. 2 shows an exemplary programming bloc of a process controller for determining the total flow rate $Q_{tot}$ of the washing liquid at the exhaust gas inlet (2) of an exemplary wet scrubber system as shown in FIG. 1, in which the pressure outside the scrubber pipe before the uppermost active spraying nozzle I is 2.1 Bar and spraying nozzles I, II, V and VI are open and thus active.

DETAILED DESCRIPTION OF THE INVENTION

Figure 1:
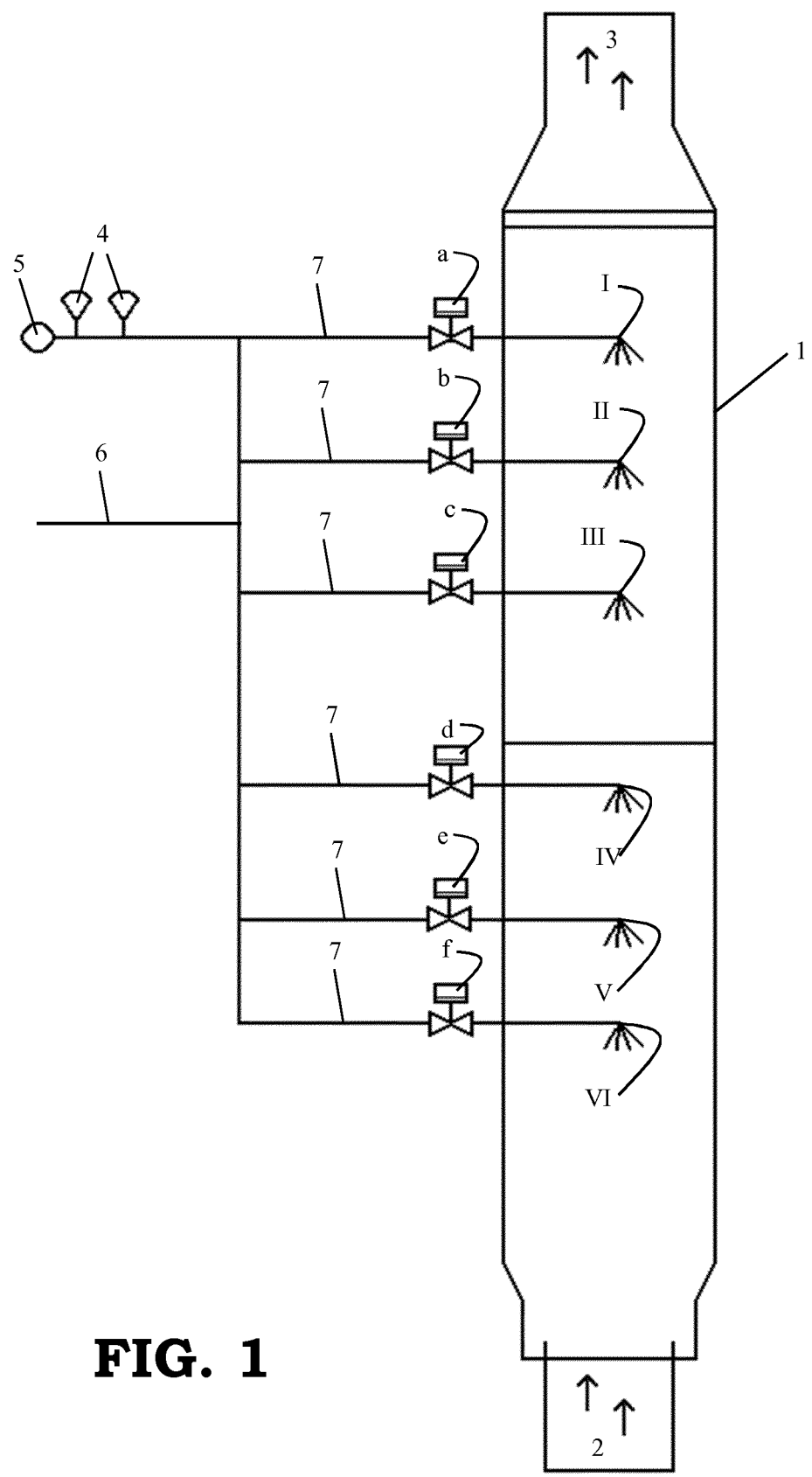
FIG. 1 shows a wet scrubber system provided with a system according to the application including two pressure sensors for measuring the pressure outside the scrubber pipe before the uppermost active spraying nozzle.

As can be seen in FIG. 1, the exhaust gas cleaning unit, more specifically the wet scrubber system, comprises a scrubber pipe (1) having an exhaust gas inlet (2) at the bottom thereof and an exhaust gas outlet (3) at the top thereof between which an exhaust gas is flowing. Inside the scrubber pipe (1), a number of spraying nozzles (I-VI) are arranged that are mounted at different height levels throughout the scrubber pipe (1). Each of the spraying nozzles (I-VI) are arranged to spray a washing liquid, more specifically sea water, into the exhaust gas present in the scrubber pipe (1) in order to clean at least part of, and more specifically the required amount of $SO_x$ out of the exhaust gas. More specifically, spraying nozzles of the spiral type are used. The washing liquid is supplied from a washing liquid main pipe (6) to different washing liquid sub pipes (7) that supply the washing liquid to the each of the different spraying nozzles (I-VI) inside the scrubber pipe (1).

Each of the spraying nozzles (I-VI) are operated by a valve (a-f), more specific a butterfly valve, arranged to open and to close each of the respective spraying nozzles (I-VI). An open and thus activated spraying nozzle is also called an 'active' spraying nozzle. These valves (a-f) are remotely controlled (opened and closed) by means of one or more actuators (not shown on the figure).

Furthermore, a system is provided to determine the total flow rate $Q_{tot}$ of the washing liquid in the washing liquid main pipe (6), which is required according to the MEPC.259 (68) 4.4.7, 2015 "Guidelines for exhaust gas cleaning systems". The system therefore comprises a process controller (not shown on the figures) that is arranged to calculate the total flow rate $Q_{tot}$ of the washing liquid in the washing liquid main pipe (6) by summing up the different individual flow rates $Q_{ind}$ of the washing liquid to each of the individual active spraying nozzles. The process controller is therefore also arranged to calculate the flow rate $Q_{ind}$ of the washing liquid flowing through each of the individual active spraying nozzles, using the formula:

$$Qind = K \times \sqrt{(P - \text{pressure correction} + \text{height correction})},$$

wherein

P is the pressure applied upon the uppermost active spraying nozzle,

K is a spraying nozzle factor depending on the type of spraying nozzle, the pressure correction is a correction factor of the pressure P as a function of the elevation of the respective spraying nozzle in the scrubber pipe, expressed in Bar, and the height correction is a correction factor of the pressure P based on the height difference between the location of the pressure sensor to the respective spraying nozzle where the flow rate is calculated, expressed in Bar.

In order to measure the pressure P applied upon the uppermost active spraying nozzle, the system comprises at least one pressure sensor (4). The pressure P is more specifically measured inside the washing liquid main pipe (6) outside the scrubber pipe (1) before the valve that is operating the uppermost active spraying nozzle (see FIG. 1). More in particular, two pressure sensors (4) are applied for the redundancy, i.e. if the measured pressure difference is bigger in one of these two pressure sensors (4), they need to be checked and the faulty one needs to be prepared. A pressure indicator (5) indicates the pressure P as measured by the two pressure sensors (4) (which should be the same for each of the pressure sensors (4)).

Advantageously, the pressure and the height correction are determined during installation of the wet scrubber system.

In case there is no flow of scrubber liquid through the wet scrubber, and thus the pump is stopped, the flow at the height of each of the spraying nozzles (I-VI) is zero and consequently also the total flow at the height of the inlet of the wet scrubber is zero.

The system can comprise an exhaust gas emission monitoring system arranged to provide an alarm in case the ratio of $SO_2/CO_2$ in the exhaust gas exceeds an alarm limit.

Example

FIG. 2 shows an exemplary programming bloc of a process controller for determining the total flow rate $Q_{tot}$ of the washing liquid at the exhaust gas inlet (2) of an exemplary wet scrubber system as shown in FIG. 1. As can be seen in FIG. 2, the uppermost active spraying nozzle is the first spraying nozzle (I). The pressure measured at the outside of the scrubber pipe (1) before the operating valve of the first spraying nozzle (I) (I_Pressure) was 2.1 Bar. Also the second, fifth and sixth spraying nozzles (II, V and VI) were opened and thus active.

The flow rate $Q_{ind}$ at the height of the different individual spraying nozzles is the following:
spraying nozzle I: $1550 \times \sqrt{(2.1-0.4)} = 2020.95$ l/min or 121.2572 m³/h;
spraying nozzle II: $2552 \times \sqrt{(2.1-0.4+0.1)} = 3423.87$ l/min or 205.432 m³/h;
spraying nozzle V: $1752 \times \sqrt{(2.1-0.4+0.8185)} = 2780.39$ l/min or 166.8231 m³/h;
spraying nozzle VI: $1752 \times \sqrt{(2.1-0.4+0.9085)} = 2829.63$ l/min or 169.7777 m³/h.

The total flow rate $Q_{tot}$ of the washing liquid at the inlet of the scrubber (O_Flow) was then the sum of the individual flow rates $Q_{ind}$ per spraying nozzle (121.2572+205.432+166.8231+169.7777) m³/h or 663 m³/h.

The invention claimed is:

1. A system to determine a total flow rate ($Q_{tot}$) of a washing liquid at a washing liquid inlet of an exhaust gas cleaning unit installed in a marine vessel, the exhaust gas cleaning unit comprising
a scrubber pipe comprising an exhaust gas flowing between an exhaust gas inlet and an exhaust gas outlet;
two or more spraying nozzles mounted at different height levels in the scrubber pipe, wherein each of the spraying nozzles is
adapted to spray washing liquid into the exhaust gas present in the scrubber pipe in order to clean at least part of the SOx out of the exhaust gas; and
operated by a valve adapted to open and to close the respective spraying nozzle, and comprising an uppermost active spraying nozzle that is opened and activated by its respective valve;
wherein the system comprises
at least one pressure sensor arranged to measure a pressure (P) applied to the uppermost active spraying nozzle, expressed in Bar; and
a process controller
calculating a flow rate ($Q_{ind}$) of the washing liquid flowing through each of the individual active spraying nozzles, expressed in liter per minute or cubic meter per hour (m3/h), using the formula:

$Qind = K \times \sqrt{(P\text{-pressure correction+height correction})}$ wherein K is a spraying nozzle factor depending on the type of spraying nozzle,
the pressure correction is a correction factor of the pressure (P) as a function of the elevation of the respective spraying nozzle in the scrubber pipe, expressed in Bar, and
the height correction is a correction factor of the pressure (P) based on the height difference between the location of the pressure sensor to the respective active spraying nozzle where the flow rate is calculated, expressed in Bar; and
calculating the total flow rate ($Q_{tot}$) of the washing liquid at the washing liquid inlet of the exhaust gas cleaning unit, expressed in liter per minute or cubic meter per hour (m3/h), by summing up the different flow rates ($Q_{ind}$) of the washing liquid through each of the individual active spraying nozzles.

2. The System according to claim 1, wherein the pressure (P) applied to the uppermost active spraying nozzle is the pressure of the washing liquid measured outside the scrubber pipe before the uppermost active spraying nozzle.

3. The System according to claim 1, wherein the spraying nozzles are of the spiral type.

4. The System according to claim 1, wherein the valves operating the spraying nozzles are remotely controlled.

5. Method A method to determine a total flow rate ($Q_{tot}$) of a washing liquid at an washing liquid inlet of an exhaust gas cleaning unit installed in a marine vessel, the exhaust gas cleaning unit comprising a scrubber pipe comprising an exhaust gas flowing between an exhaust gas inlet and an exhaust gas outlet in the scrubber pipe and two or more spraying nozzles in the scrubber pipe; wherein the method comprises the steps of
spraying washing liquid by means of two or more active spraying nozzles, that are opened and activated by a respective operable valve, and that are arranged at different heights in the scrubber pipe of the exhaust gas cleaning unit, into the exhaust gas present in the scrubber pipe for cleaning at least part of the $SO_x$ out of the exhaust gas,
measuring a pressure (P) applied to an uppermost active spraying nozzle opened and activated by its respective valve, expressed in Bar, using one or more pressure sensors;
calculating a flow rate ($Q_{ind}$) of the washing liquid flowing through each of the separate active spraying nozzles, expressed in liter per minute or cubic meter per hour (m3/h), by means of a process controller using the formula:

$Qind = K \times \sqrt{(P\text{-pressure correction+height correction})}$ wherein
K is a spraying nozzle factor depending on the type of spraying nozzle,
the pressure correction is a correction factor of the pressure (P) as a function of the elevation of the respective spraying nozzle in the scrubber pipe, expressed in Bar, and
the height correction is a correction factor of the pressure (P) based on the height difference between the location of the pressure sensor to the respective spraying nozzle where the flow rate is calculated, expressed in Bar;
calculating the total flow rate ($Q_{tot}$) of the washing liquid at the washing liquid inlet of the exhaust gas cleaning unit, expressed in liter per minute or cubic meter per hour (m3/h), by means of the process controller by summing up the different flow rates ($Q_{ind}$) of the washing liquid through each of the individual active spraying nozzles.

6. The method according to claim 5, wherein the pressure (P) and the height correction are determined during installation of the exhaust gas cleaning unit.

7. The method according to claim 5, wherein the method is computer-implemented.

8. A computer program product comprising program code instructions for implementing a method according to claim 5.

* * * * *